(12) United States Patent
Pan

(10) Patent No.: US 7,225,449 B2
(45) Date of Patent: May 29, 2007

(54) OPTICAL DISK RECORDING AND/OR REPRODUCING APPARATUS

(75) Inventor: Guo-Chen Pan, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 442 days.

(21) Appl. No.: 10/863,315

(22) Filed: Jun. 7, 2004

(65) Prior Publication Data
US 2004/0250269 A1 Dec. 9, 2004

(30) Foreign Application Priority Data
Jun. 5, 2003 (CN) ................................. 03247073

(51) Int. Cl.
*G11B 33/02* (2006.01)
(52) U.S. Cl. ...................................... 720/604; 720/612
(58) Field of Classification Search .................. None
See application file for complete search history.

(56) References Cited

U.S. PATENT DOCUMENTS

| 4,829,510 A * | 5/1989 | Takahashi ................... 720/721 |
| 6,208,613 B1 * | 3/2001 | Iizuka ......................... 720/707 |
| 6,928,045 B2 * | 8/2005 | Eum et al. ................. 369/270.1 |
| 7,055,156 B2 * | 5/2006 | Chuang et al. ............. 720/604 |
| 2002/0044521 A1 * | 4/2002 | Sogawa et al. ............. 369/270 |
| 2002/0196728 A1 * | 12/2002 | Morishita .................... 369/264 |

FOREIGN PATENT DOCUMENTS

CN 96113218.3 6/1997

* cited by examiner

*Primary Examiner*—Allen Cao
(74) *Attorney, Agent, or Firm*—Wei Te Chung

(57) ABSTRACT

An optical disk recording and/or reproducing apparatus (100) includes a first case (110), a base (130), and a main body (140). The first case includes a supporting device (116) with a hole (118) defined therein, and a disk clamper (10). The main body is accommodated in the base, and includes a spindle motor (142) and a turntable (148). A magnetic element (149) is positioned on the turntable. The disk clamper includes a clamping body (12), a magnet (14), and a clip (16). The clamping body and the clip are respectively positioned on lower and upper sides of the supporting device, and fixed together through the hole. The magnet is sandwiched between the clamping body and the clip. In use, because of attraction of the magnet and the magnetic element, opposite sides of an optical disk (220) are respectively clamped by the clamping body and the turntable.

19 Claims, 4 Drawing Sheets

OPTICAL DISK RECORDING AND/OR REPRODUCING APPARATUS

BACKGROUND OF THE INVENTION

1. Field of the Invention

The present invention generally relates to an optical disk recording and/or reproducing apparatus which has a relatively simple structure and which can firmly clamp an optical disk therein.

2. Description of Prior Art

A typical optical disk defines a clamping area between a central hole thereof and a data storage area thereof. The clamping area is used for a disk clamper of an optical disk recording and/or reproducing apparatus to clamp the optical disk. In operation, the optical disk is carried into or out from the optical disk recording and/or reproducing apparatus by a sliding loading device. When the optical disk is loaded, it is positioned on a turntable of the optical disk recording and/or reproducing apparatus. The turntable rotates the optical disk, and an optical pick-up head is driven along a radial direction of the optical disk by a driving mechanism and a guiding mechanism. The optical pick-up head thus reads and/or reproduces information contained in the optical disk.

The conventional disk clamper clamps the optical disk using elastic means. A first elastic device is placed on a top surface of the turntable, and a second elastic device is placed at an undersurface of the disk clamper. When the optical disk is positioned on the turntable, the first elastic device and the second elastic device separately clamp the turntable and the disk clamper, so that the two sides of the clamping area of the optical disk are pressed by the turntable and the disk clamper separately. Thus the optical disk is fastened between the turntable and the disk clamper. A related Chinese patent disclosing this structure is CN96113218.

However, this kind of disk clamper has an unduly complex structure. In addition, if the optical disk recording and/or reproducing apparatus is subjected to vibration from an outside source, the first elastic device and the second elastic device are liable to vibrate too, and the rotation of the optical disk may become unstable. Furthermore, because the diameter of the disk clamper is usually small, and because the second elastic device is usually smaller than the disk clamper, the second elastic device cannot provide enough clamping force to reliably clamp the optical disk. Yet if the diameter of the second elastic device is enlarged, the disk clamper must be correspondingly enlarged to the extent that it approaches the size of the diameter of the clamping area of the optical disk. In these circumstances, if there is no optical disk in the optical disk recording and/or reproducing apparatus, the optical pick-up head is liable to scan a peripheral portion of the disk clamper. If the peripheral portion of the disk clamper can reflect light, then the optical pick-up head may misread the disk clamper as being an optical disk. Moreover, when an optical disk is rotating in the optical disk recording and/or reproducing apparatus, the peripheral portion of the disk clamper is liable to scrape and damage the data storage area of the optical disk.

An optical disk recording and/or reproducing apparatus which can overcome the above-described problems is desired.

SUMMARY OF THE INVENTION

Accordingly, an object of the present invention is to provide an optical disk recording and/or reproducing apparatus which has a relatively simple structure and which can effectively prevent misreading by an optical pick-up head.

To achieve the above object, an optical disk recording and/or reproducing apparatus includes a first case, a second case, a base, a main body, and a disk tray. The first case comprises a supporting means with a hole defined therein, and a disk clamper. The base has a front panel, with an opening defined therein. The disk tray is positioned on the base, and moves backward and forward (horizontally) with respect to the main body for conveying an optical disk through the opening. The main body is accommodated in the base, and includes a spindle motor and a turntable. The spindle motor can drive the turntable to rotate. A magnetic element, which can be attracted by a magnet, is positioned on the turntable. The first case and the second case are fixed to the base. The disk clamper comprises a clamping body, a magnet, and a clip. The clamping body and the clip are respectively positioned on lower and upper sides of the supporting means. Part of the clamping body is passed through the hole of the supporting means, and the magnet is placed in the clamping body. The clip is then fixed to the clamping body, with the magnet being sandwiched between the clamping body and the clip. In use, because of attraction of the magnet and the magnetic element, opposite sides of an optical disk are respectively clamped by the clamping body and the turntable.

Other objects, advantages and novel features of the present invention will be drawn from the following detailed description of a preferred embodiment of the present invention with attached drawings, in which:

DETAILED DESCRIPTION OF PREFERRED EMBODIMENT

Figure 1:
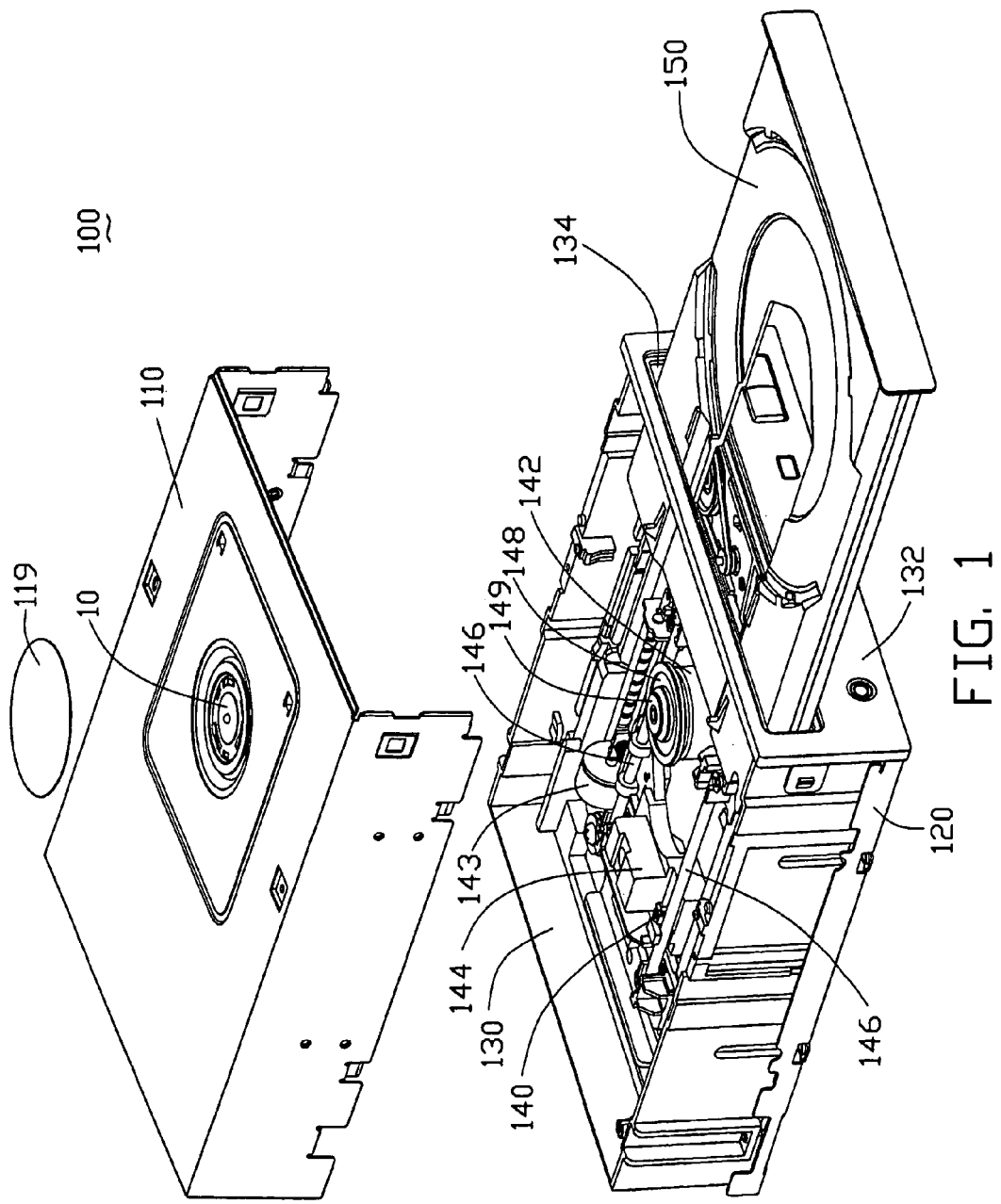
FIG. 1 is an exploded, isometric view of an optical disk recording and/or reproducing apparatus of the present invention.

Referring to FIG. 1, an optical disk recording and/or reproducing apparatus 100 in accordance with the present invention may be a DVD-ROM (Digital Video Disk-Read Only Memory) or CD-ROM (Compact Disk-Read Only Memory) drive. The optical disk recording and/or reproducing apparatus 100 includes a first case 110, a second case 120, a base 130, a main body 140, and a disk tray 150. A disk clamper 10 is positioned on the first case 110. The base 130 has a front panel 132, with an opening 134 defined therein. The disk tray 150 is positioned on the base 130, and moves backward and forward (horizontally) with respect to the main body 140 for conveying an optical disk 220 (see FIG. 5) through the opening 134. The main body 140 is accommodated in the base 130, and includes a spindle motor 142, a stepping motor 143, an optical pick-up head 144, two guiding frames 146 and a turntable 148. The optical pick-up head 144 is hung between the guiding frames 146. The optical pick-up head 144 moves along a radial direction of the optical disk 220, being driven by the stepping motor 143 and guided by the guiding frames 146. A magnetic element 149, which can be attracted by a magnet, is positioned on the turntable 148. The first case 110 and the second case 120 can be fixed to the base 130 by a fastening device as is known in the art. An ascending and descending unit (not shown) can pivotally support the main body 140 to be moved between a raised position (shown in FIG. 5) and a lowered position (not shown). In operation, the disk tray 150 conveys the optical disk 220 into the main body 140. The ascending and descending unit moves the main body 140 together with the turntable 148 upwardly. The optical disk 220 is positioned on the turntable 148, with the magnetic element 149 and the disk clamper 10 cooperatively holding two opposite sides of a clamping area of the optical disk 220. The spindle motor 142 drives the turntable 148 with the optical disk 220 thereon to rotate. The optical pick-up head 144 records and/or reads information in the optical disk 220 by moving in the radial direction of the optical disk 220, the optical pick-up head 144 being driven by the stepping motor 143 and guided by the guiding frames 146.

Figure 2:
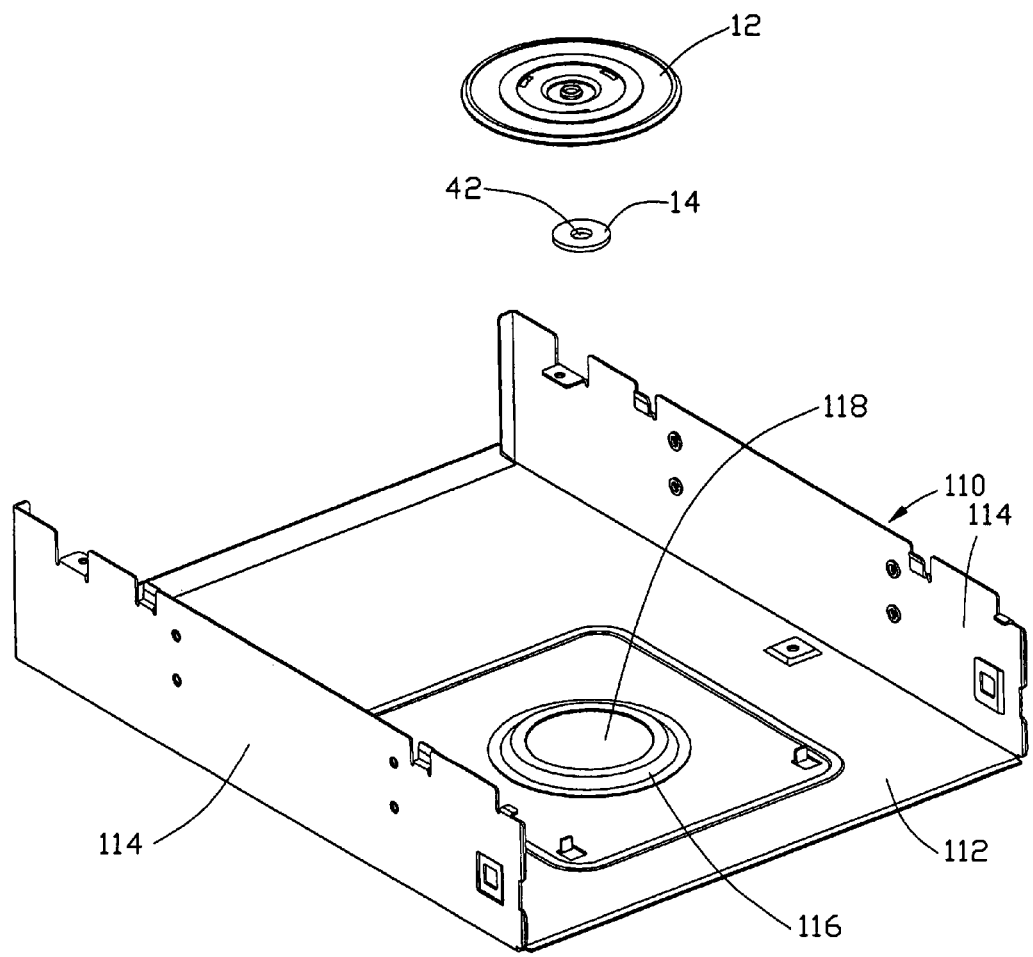
FIG. 2 is essentially an exploded, isometric, inverted view of a first case and a disk clamper of the optical disk recording and/or reproducing apparatus of FIG. 1.

Referring to FIG. 2, the first case 110 includes a base board 112, and two parallel side walls 114. The side walls 114 extend from two opposite edges of the base board 112, and are perpendicular to the base board 112. A recessed supporting means 116 is formed on an inside of the base board 112. A hole 118 is defined in the supporting means 116. The first case 110 further includes a cover 119, which plugs a shallow recess (not labeled) defined in an outside of the base board 112 at the supporting means 116.

Figure 3:
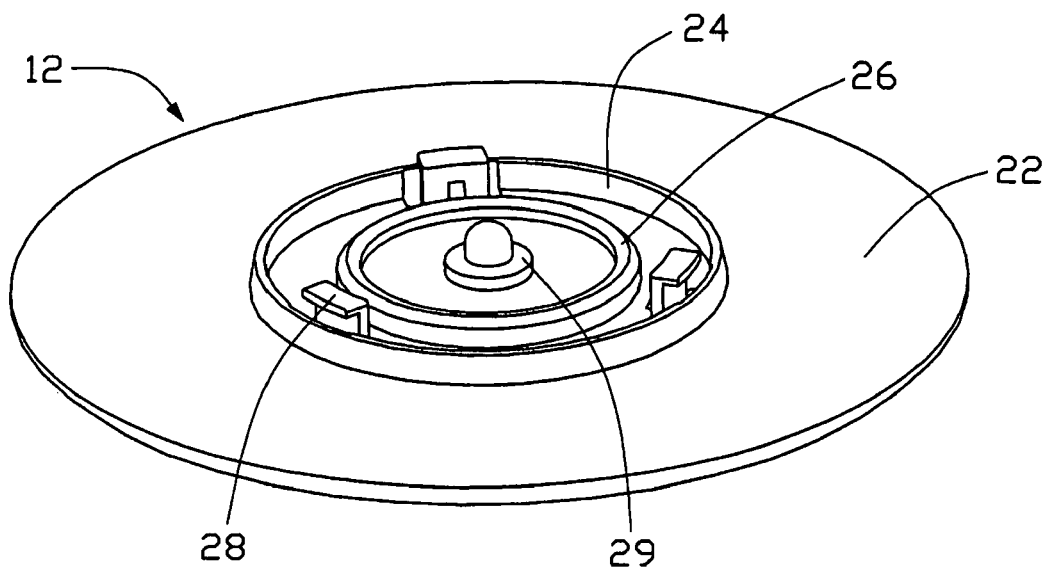
FIG. 3 is an enlarged, isometric view of a clamping body of the disk clamper shown in FIG. 2, showing the clamping body inverted relative to FIG. 2.
Figure 4:
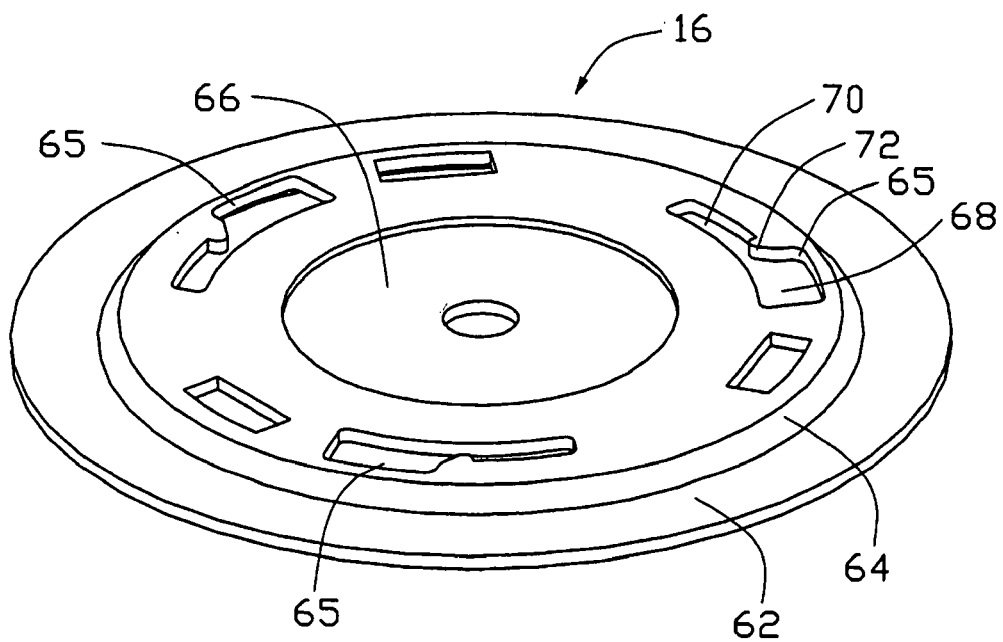
FIG. 4 is an enlarged, isometric view of a clip of the disk clamper shown in FIG. 2.

Referring also to FIGS. 3 and 4, the disk clamper 10 includes a clamping body 12, a magnet 14, and a clip 16. The clamping body 12 and the clip 16 are respectively positioned on the two sides of the supporting means 116, and fixed together through the hole 118 of the supporting means 116. The magnet 14 is sandwiched between the clamping body 12 and the clip 16. The clamping body 12 has a disk-shaped fastening means 22, with a diameter of the fastening means 22 being larger than a diameter of the hole 118. A shallow, annular supporting means 24 extends upwardly from a center portion of the fastening means 22, with a diameter of the supporting means 24 being slightly less than a diameter of the hole 118. A shallow, annular housing 26 extends upwardly from the center portion of the fastening means 22 within the supporting means 24. A locating protrusion 29 extends upwardly from a center of the fastening means 22 within the housing 26. A plurality of evenly spaced hooks 28 extends upwardly from the center portion of the fastening means 22 between the supporting means 24 and the housing 26. A diameter of the magnet 14 is slightly less than an inner diameter of the housing 26. A hole 42 is defined in a center of the magnet 14, with a diameter of the hole 42 being slightly greater than a diameter of the locating protrusion 29. Thus the magnet 14 is received in the housing 26, with the locating protrusion 29 being engaged in the hole 42.

The clip 16 includes an annular base part 62, and a round fastening part 64 in a middle of and downwardly offset from the base part 62. A diameter of the fastening part 64 is approximately the same as the diameter of the supporting means 24, and greater than the diameter of the hole 118. A trough 66 used for holding the magnet 14 is defined in a middle of the fastening part 64. A plurality of evenly spaced fastening holes 65 is defined in a periphery of the fastening part 64. Each fastening hole 65 comprises a wider entry portion 68 and a narrower clipping portion 70, with a clipping protrusion 72 being formed between the entry portion 68 and the clipping portion 70.

In assembly, firstly part of the clamping body 12 is inserted into the hole 118 of the supporting means 116 via an inside surface of the first case 110. Because the diameter of the fastening means 22 is greater than that of the hole 118, the fastening means 22 abuts the supporting means 116. Because the diameter of the supporting means 24 is less than that of the hole 118, the supporting means 24 passes through the hole 118. Then the magnet 14 is placed into the housing 26 of the clamping body 12. The clip 16 is inserted into the recess of the base board 112 of the first case 110, with the hooks 28 being received in the entry portions 68 of the fastening holes 65, and the fastening part 64 abutting the supporting means 24 of the clamping body 12. The clamping body 12 is rotated in a clockwise direction, so that the hooks 28 snap over the clipping protrusions 72 and are engaged in the clipping portions 70. The hooks 28 are blocked from sliding back into the entry portions 68 by the clipping protrusions 72. Finally, the cover 119 is engaged in the recess of the base board 112.

Figure 5:
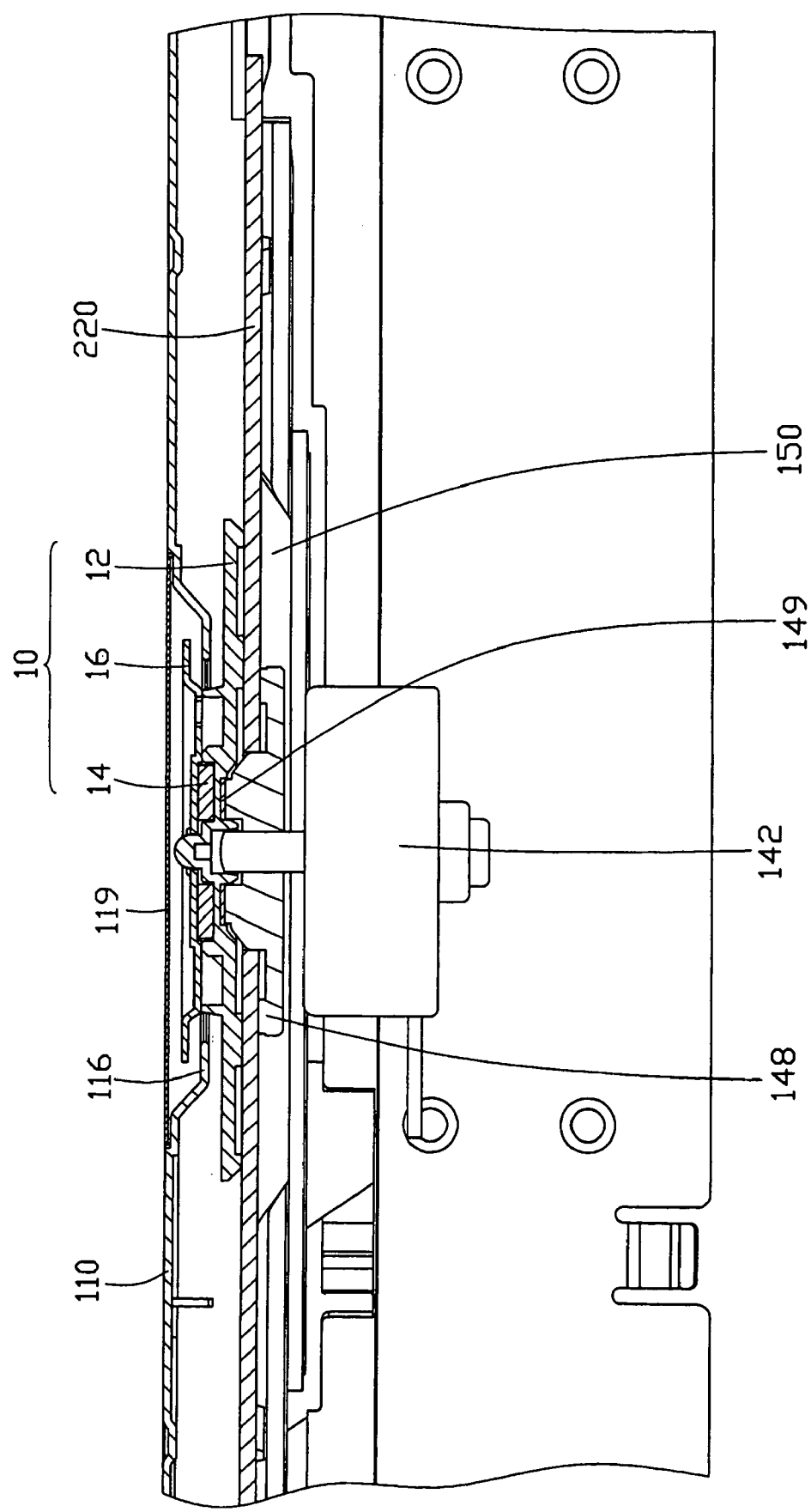
FIG. 5 is a partial sectional view of the optical disk recording and/or reproducing apparatus of FIG. 1 fully assembled, showing the disk clamper cooperating with a turntable of the optical disk recording and/or reproducing apparatus.

Referring to FIG. 5, in operation of the optical disk recording and/or reproducing apparatus 100, the optical disk 220 is placed in the disk tray 150. The disk tray 150 conveys the optical disk 220 into the main body 140. The ascending and descending unit moves the main body 140 upwardly, so that the optical disk 220 is positioned on the turntable 148. Because of attraction of the magnet 14 and the magnetic element 149, the two sides of the clamping area of the optical disk 220 are respectively clamped by the clamping body 12 and the turntable 148. Even though a diameter of the disk clamper 10 is much less than a diameter of the clamping area of the optical disk 220, the magnet 14 and the magnetic element 149 provide ample magnetic attraction to firmly clamp the optical disk 220 and thus enable it to rotate steadily. Therefore the optical disk 220 is prevented from being misread or damaged.

Although the present invention has been described with reference to a specific embodiment, it should be noted that the described embodiment is not necessarily exclusive, and that various changes and modifications may be made to the described embodiment without departing from the scope of the invention as defined by the appended claims.

What is claimed is:

1. An optical disk recording and/or reproducing apparatus for recording and/or reproducing information in an optical disk, comprising:

a base;

a first case fixed to the base, the first case comprising a supporting means with a hole defined therein, and a disk clamper, the disk clamper comprising a clamping body, a magnet and a clip, the clamping body and the clip being respectively positioned on two opposite sides of the supporting means, and being fixed together through the hole of the supporting means, the magnet being sandwiched between the clamping body and the clip;

a second case fixed to the base;

a main body accommodated in the base, the main body comprising a turntable with a magnetic element positioned thereon, and a spindle motor which can drive the turntable to rotate; and a disk tray positioned on the base for conveying the optical disk;

wherein, the optical disk defines a clamping area, and a diameter of the disk clamper is less than that of the clamping area.

2. The optical disk recording and/or reproducing apparatus in accordance with claim 1, wherein the first case includes a base board, and two parallel side walls parallel extending perpendicularly in a same direction from two opposite sides of the base board.

3. The optical disk recording and/or reproducing apparatus in accordance with claim 2, wherein a recessed supporting means is formed on an inside of the base board.

4. The optical disk recording and/or reproducing apparatus in accordance with claim 3, wherein the clamping body comprises a disk-shaped fastening means with a diameter larger than that of the hole on the supporting means, and an annular supporting flange extending upwardly from a center portion of the fastening means.

5. The optical disk recording and/or reproducing apparatus in accordance with claim 4, wherein an annular housing extends upwardly from the center portion of the fastening means within the supporting flange.

6. The optical disk recording and/or reproducing apparatus in accordance with claim 5, wherein a plurality of evenly spaced hooks extends upwardly from the center portion of the fastening means between the supporting flange and the housing.

7. The optical disk recording and/or reproducing apparatus in accordance with claim 6, wherein the clip includes an annular base part, and a round fastening part in a middle of and downwardly offset from the base part.

8. The optical disk recording and/or reproducing apparatus in accordance with claim 7, wherein the fastening part defines a plurality of fastening holes, and each fastening hole comprises a wider entry portion and a narrower clipping portion.

9. The optical disk recording and/or reproducing apparatus in accordance with claim 8, wherein a clipping protrusion is formed at each fastening hole between the entry portion and the clipping portion.

10. The optical disk recording and/or reproducing apparatus in accordance with claim 9, wherein the first case further includes a cover which plugs a shallow recess defined in an outside of the base board.

11. A disk clamper adapted to be attached to a supporting means with a hole of an optical disk recording and/or reproducing apparatus, the disk clamper comprising:
  a clamping body;
  a clip; and
  a magnet sandwiched between the clamping body and the clip;
  wherein the clamping body and the clip are respectively positioned on two opposite sides of the supporting means and are fixed together through the hole of the supporting means.

12. The disk clamper in accordance with claim 11, wherein the clamping body comprises a disk-shaped fastening means with a diameter larger than that of the hole of the supporting means, and an annular supporting flange extending upwardly from a center portion of the fastening means.

13. The disk clamper in accordance with claim 12, wherein an annular housing extends upwardly from the center portion of the fastening means within the supporting flange.

14. The disk clamper in accordance with claim 13, wherein a plurality of hooks extends upwardly from the center portion of the fastening means between the supporting flange and the housing.

15. The disk clamper in accordance with claim 14, wherein the clip includes an annular base part, and a round fastening part in a middle of and downwardly offset from the base part.

16. The disk clamper in accordance with claim 15, wherein the fastening part defines a plurality of fastening holes, and each fastening hole comprises a wider entry portion and a narrower clipping portion.

17. An optical disk recording and/or reproducing apparatus assembly comprising:
  a base defining a turntable thereof, said turntable being moveable relative to the base in a vertical direction;
  a case located above said base;
  a disk tray moveable between the turntable and the case in a horizontal direction perpendicular to said vertical direction;
  a disk initially position upon the disk tray and successively raised upwardly in the vertical direction by said turntable;
  a disk clamper associated with the case and aligned above the turntable in the vertical direction, and including at least one clamping body abutting against the disk;
  a first device located on a back of said clamping body opposite to the disk;
  a second device located around the turntable and beneath said disk;
  wherein
  at least one of said first device and said second device perform as a magnetic to attract the other so as to reliably sandwich the disk between the clamping body and the turntable.

18. The assembly in accordance with claim 17, wherein said clamping body defines a diameter larger than the first device.

19. The assembly in accordance with claim 17, wherein said clamping body defines a diameter larger than the turntable.

* * * * *